US008741805B2

(12) United States Patent
Boucher, Jr. et al.

(10) Patent No.: US 8,741,805 B2
(45) Date of Patent: *Jun. 3, 2014

(54) ENHANCED NITRIFICATION INHIBITOR COMPOSITION

(75) Inventors: Raymond E. Boucher, Jr., Lebanon, IN (US); Mei Li, Westfield, IN (US); Martin C. Logan, Indianapolis, IN (US)

(73) Assignee: Dow AgroSciences, LLC., Indianapolis, IN (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/393,661

(22) Filed: Feb. 26, 2009

(65) Prior Publication Data

US 2009/0227458 A1  Sep. 10, 2009

Related U.S. Application Data

(63) Continuation-in-part of application No. 12/009,432, filed on Jan. 18, 2008.

(60) Provisional application No. 60/881,680, filed on Jan. 22, 2007.

(51) Int. Cl.
*A01N 43/40* (2006.01)
*C05C 9/00* (2006.01)
*C05G 3/08* (2006.01)

(52) U.S. Cl.
USPC ............... 504/101; 504/244; 71/27; 71/30

(58) Field of Classification Search
USPC .......................................... 71/88; 504/101
See application file for complete search history.

(56) References Cited

U.S. PATENT DOCUMENTS

| 4,285,720 | A | * | 8/1981 | Scher | 504/112 |
| 4,808,206 | A | * | 2/1989 | Smith | 71/64.07 |
| 4,985,064 | A | * | 1/1991 | Redlich et al. | 504/352 |
| 2005/0208089 | A1 | * | 9/2005 | Asrar et al. | 424/405 |

* cited by examiner

*Primary Examiner* — Anoop Singh
*Assistant Examiner* — Anna Falkowitz
(74) *Attorney, Agent, or Firm* — C. W. Arnett; Faegre Baker Daniels LLP

(57) ABSTRACT

The present invention relates to an improved nitrification inhibitor composition and its use in agricultural applications.

17 Claims, No Drawings

ENHANCED NITRIFICATION INHIBITOR COMPOSITION

CROSS-REFERENCES TO RELATED APPLICATIONS

This application is a continuation-in-part application of U.S. patent application Ser. No. 12/009,432, filed Jan. 18, 2008, which claims the benefit of U.S. Provisional Application Ser. No. 60/881,680 filed on Jan. 22, 2007, which is expressly incorporated by reference herein.

The present invention relates to an improved nitrification inhibitor composition and its use in agricultural applications.

BACKGROUND (Trichloromethyl)pyridine compounds, such as nitrapyrin, have been used as nitrification inhibitors in combination with fertilizers as described in U.S. Pat. No. 3,135,594, which is herein incorporated by reference. These compounds maintain applied ammonium nitrogen in the ammonium form (stabilized nitrogen), which enhances crop performance. It would be desirable to broadly apply these compounds with nitrogenous fertilizer at sowing time, but due to potential volatility losses, these application methods are generally unsatisfactory. In addition nitrapyrin has been added to anhydrous ammonia, which by default must be injected into the soil.

Other nitrapyrin formulations have been applied to the surface of the soil, but must either be incorporated mechanically, or watered into the soil within 8 hours after application to overcome volatility losses. Finally, rapid or dump release capsule formulations of nitrapyrin encapsulated with lignin sulfonates have also been disclosed in U.S. Pat. No. 4,746,513, which is incorporated herein by reference. However, although the release of nitrapyrin is delayed by the encapsulation, the capsules release all of the nitrapyrin upon contact with moisture, exhibiting the same stability and volatility disadvantages of the prior application methods. Additionally, these formulations are difficult and costly to produce and cannot be used with liquid urea ammonium nitrate ("UAN") fertilizers.

Polycondensation encapsulation, as disclosed in U.S. Pat. No. 5,925,464, has been used to encapsulate agriculturally active ingredients, particularly to enhance handling safety and storage stability of the active ingredient by using polyurethane rather than polyurea encapsulants.

However, there remains a need to deliver nitrification inhibitors such as (trichloromethyl)pyridines, having greater long term stability in the field environment, while maintaining the level of efficacy of unencapsulated inhibitors.

SUMMARY

The present invention is a microcapsule suspension formulation comprising:

(a) a suspended phase of a plurality of microcapsules having a volume median particle size of from about 1 to about 10 microns, wherein a microcapsule comprises:

(1) a microcapsule wall produced by an interfacial polycondensation reaction between a polymeric isocyanate and a polyamine to form a polyurea shell having a weight percentage of about 0.2 to about 15 percent of a total weight of the microcapsule suspension formulation; and (2) a (trichloromethyl)pyridine compound encapsulated within the polyurea shell; and (b) an aqueous phase including an ionic stabilizer.

The microcapsule suspension formulation of the present invention is stable and allows for delayed incorporation of nitrogen in crops, thus providing agronomic and environmental benefits. Surprisingly it has been discovered that a composition of microcapsulated (trichloromethyl)pyridine compounds, such as nitrapyrin, has superior performance when compared to unencapsulated compositions of nitrapyrin, even when incorporated into the soil.

DETAILED DESCRIPTION (Trichloromethyl)pyridine compounds useful in the composition of the present invention include compounds having a pyridine ring which is substituted with at least one trichloromethyl group and mineral acid salts thereof. Suitable compounds include those containing chlorine or methyl substituents on the pyridine ring in addition to a trichloromethyl group, and are inclusive of chlorination products of methylpyridines such as lutidine, collidine and picoline. Suitable salts include hydrochlorides, nitrates, sulfates and phosphates. The (trichloromethyl)pyridine compounds useful in the practice of the present invention are typically oily liquids or crystalline solids dissolved in a solvent. Other suitable compounds are described in U.S. Pat. No. 3,135,594. A preferred (trichloromethyl)pyridine is 2-chloro-6-(trichloromethyl)pyridine, also known as nitrapyrin, and the active ingredient of the product N-SERVE™. (Trademark of Dow AgroSciences LLC).

Examples of typical solvents which can be used to dissolve crystalline (trichloromethyl)pyridine compounds include aromatic solvents, particularly alkyl substituted benzenes such as xylene or propylbenzene fractions, and mixed naphthalene and alkyl naphthalene fractions; mineral oils; kerosene; dialkyl amides of fatty acids, particularly the dimethylamides of fatty acids such as the dimethyl amide of caprylic acid; chlorinated aliphatic and aromatic hydrocarbons such as 1,1,1-trichloroethane and chlorobenzene; esters of glycol derivatives, such as the acetate of the n-butyl, ethyl, or methyl ether of diethyleneglycol and the acetate of the methyl ether of dipropylene glycol; ketones such as isophorone and trimethylcyclohexanone (dihydroisophorone); and the acetate products such as hexyl or heptyl acetate. The preferred organic liquids are xylene, alkyl substituted benzenes, such as propyl benzene fractions, and alkyl naphthalene fractions.

In general, the amount of solvent employed, if desired, is typically from about 40, preferably from about 50 to about 70, preferably to about 60 weight percent, based on the total weight of a (trichloromethyl)pyridine/solvent solution. The amount of (trichloromethyl)pyridine within a (trichloromethyl)pyridine/solvent solution is typically from about 30, preferably from about 40 to about 60, preferably to about 50 weight percent, based on the weight of a (trichloromethyl)pyridine/solvent solution.

The microcapsules useful in the present invention can be prepared by the polycondensation reaction of a polymeric isocyanate and a polyamine to form a polyurea shell. Methods of microencapsulation are well known in the art and any such method can be utilized in the present invention to provide the capsule suspension formulation. In general, the capsule suspension formulation can be prepared by first mixing a polymeric isocyanate with a (trichloromethyl)pyridine/solvent solution. This mixture is then combined with an aqueous phase which includes an emulsifier to form a two phase system. The organic phase is emulsified into the aqueous phase by shearing until the desired particle size is achieved. An aqueous crosslinking polyamine solution is then added dropwise while stirring to form the encapsulated particles of (trichloromethyl)pyridine in an aqueous suspension.

The desired particle size and cell wall thickness will depend upon the actual application. The microcapsules typically have a volume median particle size of from about 1 to about 10 microns and a capsule wall thickness of from about 10 to about 125 nanometers. In one embodiment, wherein the formulation of the present invention will be incorporated immediately into a growth medium, the desired particle size may be from about 2 to about 10 microns, with a cell wall of from about 10 to about 25 nanometers. In another embodiment, requiring soil surface stability, the desired particle size may be from about 1-5 microns, with cell wall thicknesses of from about 75 to about 125 nanometers.

Other conventional additives may also be incorporated into the formulation such as emulsifiers, dispersants, thickeners, biocides, pesticides, salts and film-forming polymers.

Dispersing and emulsifying agents include condensation products of alkylene oxides with phenols and organic acids, alkyl aryl sulfonates, polyoxyalkylene derivatives of sorbitan esters, complex ether alcohols, mahogany soaps, lignin sulfonates, polyvinyl alcohols, and the like. The surface-active agents are generally employed in the amount of from about 1 to about 20 percent by weight of the microcapsule suspension formulation.

The ratio of the suspended phase to the aqueous phase within the microcapsule suspension formulation of the present invention is dependent upon the desired concentration of (trichloromethyl)pyridine compound in the final formulation. Typically the ratio will be from about 1:0.75 to about 1:20. Generally the desired ratio is about 1:1 to about 1:7, and is preferably from about 1:1 to about 1:4.

The presence of a (trichloromethyl)pyridine compound suppresses the nitrification of ammonium nitrogen in the soil or growth medium, thereby preventing the rapid loss of ammonium nitrogen originating from nitrogen fertilizers, organic nitrogen constituents, or organic fertilizers and the like.

Generally, the microcapsule suspension formulation of the present invention is applied such that the (trichloromethyl)pyridine compound is applied to the soil or a growth medium at a rate of from about 0.5 to about 1.5 kg/hectare, preferably at a rate of from about 0.58 to about 1.2 kg/hectare. The preferred amount can be easily ascertained by the application preference, considering factors such as soil pH, temperature, soil type and mode of application.

The microcapsule suspension formulation of the present invention can be applied in any manner which will benefit the crop of interest. In one embodiment the microcapsule suspension formulation is applied to growth medium in a band or row application. In another embodiment, the formulation is applied to or throughout the growth medium prior to seeding or transplanting the desired crop plant. In yet another embodiment, the formulation can be applied to the root zone of growing plants.

Additionally, the microcapsule suspension formulation can be applied with the application of nitrogen fertilizers. The formulation can be applied prior to, subsequent to, or simultaneously with the application of fertilizers.

The microcapsule suspension formulation of the present invention has the added benefit that it can be applied to the soil surface, without additional water or mechanical incorporation into the soil for days to weeks. Alternatively, if desired, the formulation of the present invention can be incorporated into the soil directly upon application.

The microcapsule suspension formulation of the present invention typically has a concentration of (trichloromethyl)pyridine compound in amounts of from about 5, preferably from about 10 and more preferably from about 15 to about 40, typically to about 35, preferably to about 30 and more preferably to about 25 percent by weight, based on the total weight of the microcapsule suspension formulation. The microcapsule suspension formulation is then mixed with a solvent or water to obtain the desired rate for application.

Soil treatment compositions may be prepared by dispersing the microcapsule suspension formulation in fertilizers such as ammonium or organic nitrogen fertilizer. The resulting fertilizer composition may be employed as such or may be modified, as by dilution with additional nitrogen fertilizer or with inert solid carrier to obtain a composition containing the desired amount of active agent for treatment of soil.

The soil may be prepared in any convenient fashion with the microcapsule suspension formulation of the present invention, including mechanically mixed with the soil; applied to the surface of the soil and thereafter dragged or diced into the soil to a desired depth; or transported into the soil such as by injection, spraying, dusting or irrigation. In irrigation applications, the formulation may be introduced to irrigation water in an appropriate amount in order to obtain a distribution of the (trichloromethyl)pyridine compound to the desired depth of up to 6 inches (15.24 cm.).

Surprisingly, once incorporated into the soil, the microcapsule suspension formulation of the present invention outperforms other nitrapyrin formulations, especially unencapsulated versions. It was thought that the encapsulated composition would not release nitrapyrin sufficiently to be as effective as the non-encapsulated versions, wherein the diffusion from the capsule would be too slow to provide a biological effect, but in fact the opposite effect is observed.

Due to the controlled release of nitrapyrin in the microcapsule suspension formulation of the present invention, several advantages can be attained. First, the amount of nitrapyrin can be reduced since it is more efficiently released into the soil over an extended period of time. Additionally, the microcapsule suspension formulation of the present invention can be applied and left on the surface to be naturally incorporated into the soil, without the need for mechanical incorporation if desired.

Additionally, the microcapsule suspension formulation of the present invention can be combined or used in conjunction with pesticides, including arthropodicides, bactericides, fungicides, herbicides, insecticides, miticides, nematicides, nitrification inhibitors such as dicyandiamide, urease inhibitors such as N-(n-butyl) thiophosphoric triamide, and the like or pesticidal mixtures and synergistic mixtures thereof. In such applications, the microcapsule suspension formulation of the present invention can be tank mixed with the desired pesticide(s) or they can be applied sequentially.

Exemplary herbicides include, but are not limited to acetochlor, alachlor, aminopyralid, atrazine, benoxacor, bromoxynil, carfentrazone, chlorsulfuron, clodinafop, clopyralid, dicamba, diclofop-methyl, dimethenamid, fenoxaprop, flucarbazone, flufenacet, flumetsulam, flumiclorac, fluoroxypyr, glufosinate-ammonium, glyphosate, halosulfuron-methyl, imazamethabenz, imazamox, imazapyr, imazaquin, imazethapyr, isoxaflutole, quinclorac, MCPA, MCP amine, MCP ester, mefenoxam, mesotrione, metolachlor, s-metolachlor, metribuzin, metsulfuron methyl, nicosulfuron, paraquat, pendimethalin, picloram, primisulfuron, propoxycarbazone, prosulfuron, pyraflufen ethyl, rimsulfuron, simazine, sulfosulfuron, thifensulfuron, topramezone, tralkoxydim, triallate, triasulfuron, tribenuron, triclopyr, trifluralin, 2,4-D, 2,4-D amine, 2,4-D ester and the like Exemplary insecticides include, but are not limited to 1,2 dichloropropane, 1,3 dichloropropene, abamectin, acephate, acequinocyl, acetamiprid, acethion, acetoprole, acrinathrin, acrylonitrile, alanycarb, aldicarb, aldoxycarb, aldrin, allethrin, allosamidin, allyxycarb, alpha cypermethrin, alpha ecdysone, amidithion, amidoflumet, aminocarb, amiton, amitraz, anabasine, arsenous oxide, athidathion, azadirachtin, azamethiphos, azinphos ethyl, azinphos methyl, azobenzene, azocyclotin, azothoate, barium hexafluorosilicate, barthrin, benclothiaz, bendiocarb, benfuracarb, benoxafos, bensultap, benzoximate, benzyl benzoate, beta cyfluthrin, beta cypermethrin, bifenazate, bifenthrin, binapacryl, bioallethrin, bioethanomethrin, biopermethrin, bistrifluoron, borax, boric acid, bromfenvinfos, bromo DDT, bromocyclen, bromophos, bromophos ethyl, bromopropylate, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, chinomethionat, chlorantraniliprole, chlorbenside, chlorbicyclen, chlordane, chlordecone, chlordimeform, chlorethoxyfos, chlorfenapyr, chlorfenethol, chlorfenson, chlorfensulphide, chlorfenvinphos, chlorfluazuron, chlormephos, chlorobenzilate, chloroform, chloromebuform, chloromethiuron, chloropicrin, chloropropylate, chlorphoxim, chlorprazophos, chlorpyrifos, chlorpyrifos methyl, chlorthiophos, chromafenozide, cinerin I, cinerin II, cismethrin, cloethocarb, clofentezine, closantel, clothianidin, copper acetoarsenite, copper arsenate, copper naphthenate, copper oleate, coumaphos, coumithoate, crotamiton, crotoxyphos, cruentaren A &B, crufomate, cryolite, cyanofenphos, cyanophos, cyanthoate, cyclethrin, cycloprothrin, cyenopyrafen, cyflumetofen, cyfluthrin, cyhalothrin, cyhexatin, cypermethrin, cyphenothrin, cyromazine, cythioate, d-limonene, dazomet, DBCP, DCIP, DDT, decarbofuran, deltamethrin, demephion, demephion O, demephion S, demeton, demeton methyl, demeton O, demeton O methyl, demeton S, demeton S methyl, demeton S methylsulphon, diafenthiuron, dialifos, diamidafos, diazinon, dicapthon, dichlofenthion, dichlofluanid, dichlorvos, dicofol, dicresyl, dicrotophos, dicyclanil, dieldrin, dienochlor, diflovidazin, diflubenzuron, dilor, dimefluthrin, dimefox, dimetan, dimethoate, dimethrin, dimethylvinphos, dimetilan, dinex, dinobuton, dinocap, dinocap 4, dinocap 6, dinocton, dinopenton, dinoprop, dinosam, dinosulfon, dinotefuran, dinoterbon, diofenolan, dioxabenzofos, dioxacarb, dioxathion, diphenyl sulfone, disulfuram, disulfoton, dithicrofos, DNOC, dofenapyn, doramectin, ecdysterone, emamectin, EMPC, empenthrin, endosulfan, endothion, endrin, EPN, epofenonane, eprinomectin, esfenvalerate, etaphos, ethiofencarb, ethion, ethiprole, ethoate methyl, ethoprophos, ethyl DDD, ethyl formate, ethylene dibromide, ethylene dichloride, ethylene oxide, etofenprox, etoxazole, etrimfos, EXD, famphur, fenamiphos, fenazaflor, fenazaquin, fenbutatin oxide, fenchlorphos, fenethacarb, fenfluthrin, fenitrothion, fenobucarb, fenothiocarb, fenoxacrim, fenoxycarb, fenpirithrin, fenpropathrin, fenpyroximate, fenson, fensulfothion, fenthion, fenthion ethyl, fentrifanil, fenvalerate, fipronil, flonicamid, fluacrypyrim, fluazuron, flubendiamide, flubenzimine, flucofuron, flucycloxuron, flucythrinate, fluenetil, flufenerim, flufenoxuron, flufenprox, flumethrin, fluorbenside, fluvalinate, fonofos, formetanate, formothion, formparanate, fosmethilan, fospirate, fosthiazate, fosthietan, fosthietan, furathiocarb, furethrin, furfural, gamma cyhalothrin, gamma HCH, halfenprox, halofenozide, HCH, HEOD, heptachlor, heptenophos, heterophos, hexaflumuron, hexythiazox, HHDN, hydramethylnon, hydrogen cyanide, hydroprene, hyquincarb, imicyafos, imidacloprid, imiprothrin, indoxacarb, iodomethane, IPSP, isamidofos, isazofos, isobenzan, isocarbophos, isodrin, isofenphos, isoprocarb, isoprothiolane, isothioate, isoxathion, ivermectin jasmolin I, jasmolin II, jodfenphos, juvenile hormone I, juvenile hormone II, juvenile hormone III, kelevan, kinoprene, lambda cyhalothrin, lead arsenate, lepimectin, leptophos, lindane, lirimfos, lufenuron, lythidathion, malathion, malonoben, mazidox, mecarbam, mecarphon, menazon, mephosfolan, mercurous chloride, mesulfen, mesulfenfos, metaflumizone, metam, methacrifos, methamidophos, methidathion, methiocarb, methocrotophos, methomyl, methoprene, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, MNAF, monocrotophos, morphothion, moxidectin, naftalofos, naled, naphthalene, nicotine, nifluridide, nikkomycins, nitenpyram, nithiazine, nitrilacarb, novaluron, noviflumuron, omethoate, oxamyl, oxydemeton methyl, oxydeprofos, oxydisulfoton, paradichlorobenzene, parathion, parathion methyl, penfluoron, pentachlorophenol, permethrin, phenkapton, phenothrin, phenthoate, phorate, phosalone, phosfolan, phosmet, phosnichlor, phosphamidon, phosphine, phosphocarb, phoxim, phoxim methyl, pirimetaphos, pirimicarb, pirimiphos ethyl, pirimiphos methyl, potassium arsenite, potassium thiocyanate, pp' DDT, prallethrin, precocene I, precocene II, precocene III, primidophos, proclonol, profenofos, profluthrin, promacyl, promecarb, propaphos, propargite, propetamphos, propoxur, prothidathion, prothiofos, prothoate, protrifenbute, pyraclofos, pyrafluprole, pyrazophos, pyresmethrin, pyrethrin I, pyrethrin II, pyridaben, pyridalyl, pyridaphenthion, pyrifluquinazon, pyrimidifen, pyrimitate, pyriprole, pyriproxyfen, quassia, quinalphos, quinalphos, quinalphos methyl, quinothion, quantifies, rafoxanide, resmethrin, rotenone, ryania, sabadilla, schradan, selamectin, silafluofen, sodium arsenite, sodium fluoride, sodium hexafluorosilicate, sodium thiocyanate, sophamide, spinetoram, spinosad, spirodiclofen, spiromesifen, spirotetramat, sulcofuron, sulfuram, sulfluramid, sulfotep, sulfur, sulfuryl fluoride, sulprofos, tau fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetradifon, tetramethrin, tetranactin, tetrasul, theta cypermethrin, thiacloprid, thiamethoxam, thicrofos, thiocarboxime, thiocyclam, thiodicarb, thiofanox, thiometon, thionazin, thioquinox, thiosultap, thuringiensin, tolfenpyrad, tralomethrin, transfluthrin, transpermethrin, triarathene, triazamate, triazophos, trichlorfon, trichlormetaphos 3, trichloronat, trifenofos, triflumuron, trimethacarb, triprene, vamidothion, vamidothion, vaniliprole, vaniliprole, XMC, xylylcarb, zeta cypermethrin and zolaprofos.

Additionally, any combination of the above pesticides can be used.

Additionally, Rynaxypyr™, a new crop protection chemistry from DuPont with efficacy in controlling target pests can be used.

The following examples are provided to illustrate the present invention. The examples are not intended to limit the scope of the present invention and they should not be so interpreted. Amounts are in weight parts or weight percentages unless otherwise indicated.

EXAMPLES

Capsule Suspension Preparation

The weight percentages of the components for capsule suspension preparation are summarized in Table I. Total batch size is based on the weight of nitrapyrin used which is typically approximately 25 g. The emulsifiers and crosslinking amines are added as aqueous solutions of the indicated concentrations. Microcapsule suspension formulation techniques are known in the art. Additionally, it is also well know in the art that the order of addition and corresponding procedures for producing microcapsule suspension formulations may produce formulations having varying physical characteristics such as viscosity. The following preparation procedure is one illustrative embodiment of preparation procedures, and should not be considered to limit the this application.

Oil soluble monomer PAPI 27 (polymethylene polyphenylisocyanate) (Dow Chemical), is added to a wide-mouthed jar. Nitrapyrin (Dow AgroSciences) and Aromatic 200 (Exxon) are then added in the form of a 50% nitrapyrin stock solution. The resulting organic phase is combined with an aqueous solution of the emulsifier(s) as indicated in Table I. The resulting two-phase mixture is emulsified using a Silverson L4RT-A high-speed mixer fitted with the ¾ in. mixing tube and general purpose emulsification head. Emulsification is achieved by first mixing at relatively low speed (~1000 rpm) with the end of the mixing tube located in the aqueous phase to draw in the organic phase until well emulsified. The speed is then increased in discrete increments, measuring the particle size after each increase. This process is continued until the desired particle size is obtained. The water-soluble amine (diethylenetriamine (DETA, Aldrich) or ethylenediamine (EDA, Aldrich) solution (10 wt. % in water) is then added dropwise while stirring at a reduced rate. Following the completion of the addition the resulting capsule suspension is stirred for an additional minute. Following capsule formation, Kelzan S (as 1.5% aqueous solution), Veegum (as 5% aqueous solution), Proxel GXL and the balance of the water were added as indicated in Table I and a final homogenization was performed with the Silverson mixer.

TABLE I

Example Compositions

| Material | Ex. 1 | Ex. 2 | Ex. 3 | Ex. 4 | Ex. 5 | Ex. 6 | Ex. 7 |
|---|---|---|---|---|---|---|---|
| | | | | Weight Percent | | | |
| Nitrapyrin | 9.46 | 9.47 | 9.45 | 9.47 | 9.45 | 9.35 | 12.76 |
| Aromatic 200 | 9.46 | 9.47 | 9.45 | 9.47 | 9.45 | 9.35 | 15.22 |
| Dispersant/Emulsifier | 0.96[1] (added as 5% aq, sol'n) | 0.48[1] (added as 2.5% aq, sol'n) | 0.97[1] (added as 5% aq, sol'n) | 0.48[1] (added as 2.5% aq, sol'n) | 1.94[1] (added as 10% aq, sol'n) | 2.43[1] (added as 10% aq, sol'n) | 1.98[4] (added as 5% aq, sol'n) |
| Thickener[2] | 0.15 | 0.15 | 0.15 | 0.15 | 0.15 | 0.15 | 0.02 |
| Emulsifier | | | | | | | 0.99[5] |
| Suspending Aid | | | | | | | 0.2[6] |
| PAPI-27 | 0.18 | 0.09 | 0.47 | 0.23 | 0.47 | 5.61 | 9.13 |
| Amine | 0.04[7] | 0.02[7] | 0.11[7] | 0.06[7] | 0.13[8] | 1.35[7] | 2.19[7] |
| Biocide[3] | 0.1 | 0.1 | 0.1 | 0.1 | 0.1 | 0.1 | 0.1 |
| Total Water | 79.65 | 80.22 | 79.30 | 80.04 | 78.31 | 71.68 | 57.40 |
| Calculated Density | 1.057 | 1.056 | 1.058 | 1.056 | 1.059 | 1.070 | 1.097 |

[1]Gohsenol GL-03 (polyvinyl alcohol available from Nippon Gohsei)
[2]Kelzan S-Xanthan gum (available from CP Kelco)
[3]Proxel GXL (1,2-Benzisothiazol-3(2H)-one available from Arch Chemicals, Inc.)
[4]Kraftsperse 25M (available from MeadWestvaco)
[5]Tergitol 15-S-7 (available from The Dow Chemical Company)
[6]Veegum (hectorite clay) (available from R.T. Vanderbilt Co., Inc.)
[7]EDA-ethylenediamine (available from Aldrich)
[8]DETA-diethylenetriamine (available from Aldrich)

Particle Size Measurement of Capsules

Capsule suspension particle size distributions are determined using a Malvern Mastersizer 2000 light scattering particle sizer fitted with a small volume sample unit. The volume median distribution ("VMD") is reported for each formulation in Table II.

TABLE II

Particle Size and Cell Wall Thickness

| Example | Particle size (μm) | Thickness (nm) | amine |
|---|---|---|---|
| 1 | 5 | 10 | EDA |
| 2 | 10 | 10 | EDA |
| 3 | 5 | 25 | EDA |
| 4 | 10 | 25 | EDA |
| 5 | 2 | 10 | DETA |

TABLE II-continued

Particle Size and Cell Wall Thickness

| Example | Particle size (μm) | Thickness (nm) | amine |
|---|---|---|---|
| 6 | 2 | 100 | EDA |
| 7 | 2 | 100 | EDA |

Concentration of nitrapyrin is 100 g/L except for the formulation of Example 7 which is 140 g/l in the formulation based on the calculated density in Table I.
EDA—ethylenediamine
DETA—diethylenetriamine Calculation of Wall Thickness The calculation of the amounts of capsule wall components needed to achieve a target wall thickness is based on the geometric formula relating the volume of a sphere to its radius. If a core-shell morphology is assumed, with the core comprised of the non wall-forming, water insoluble components (nitrapyrin, solvent) and the shell made up of the polymerizable materials (oil- and water-soluble monomers), then equation (1) holds, relating the ratio of the volume of the core ($V_c$) and the volume of the core plus the volume of the shell ($V_s$) to their respective radii, where $r_s$ is radius of the capsule including the shell and ls is thickness of the shell.

$$\frac{V_s + V_c}{V_c} = \left(\frac{r_s}{r_s - l_s}\right)^3 \quad (1)$$

Solving equation (1) for the volume of the shell yields:

$$V_s = V_c\left(\left(\frac{r}{r_s - l_s}\right)^3 - 1\right) \quad (2)$$

Substituting masses ($m_i$) and densities ($d_i$) for their respective volumes ($m_s/d_s = V_s$ and $m_c/d_c = V_c$, where the subscript s or c refers to the shell or core, respectively) and solving for the mass of the shell gives:

$$m_s = m_c \frac{d_s}{d_c}\left(\left(\frac{r_s}{r_s - l_s}\right)^3 - 1\right) \quad (3)$$

It can be seen by comparing equations (2) and (3) that the effect of the density ratio $d_s/d_c$ is to apply a constant correction factor when masses are used to calculate the amounts of wall components needed to produce a capsule of desired size and wall thickness. To be rigorous in the calculation of $m_s$, therefore, the densities of the core and shell must be known or at least estimated from the weighted averages of the densities of each of the components. However, the primary purpose of these calculations is to use capsule wall thickness as a convenient conceptual tool which would hopefully be helpful in understanding capsule performance behavior and, therefore, in designing new capsule formulations. Approximate values are felt to be sufficient for this purpose. With this in mind the simplification is made of setting the value of $d_s/d_c$ to 1, which yields equation (4).

$$m_s \approx m_c\left(\left(\frac{r_s}{r_s - l_s}\right)^3 - 1\right) \quad (4)$$

Making the substitutions $m_c = m_o - m_{OSM}$, $m_s = m_o + (f_{WSM/OSM})m_{OSM} - m_c$, and $f_{WSM/OSM} = m_{WSM}/m_{OSM}$ (the ratio of water soluble monomer to oil soluble monomer), where $m_o$ is the total mass of the oil components (nitrapyrin, solvent, oil-soluble monomer), $m_{OSM}$ is the mass of the oil-soluble monomer, and $m_{WSM}$ is the mass of the water-soluble monomer, and solving for $m_{OSM}$ yields:

$$m_{OSM} = \frac{m_o\left(\left(\frac{r_s}{r_s - l_s}\right)^3 - 1\right)}{f_{WSM/OSM} + \left(\frac{r_s}{r_s - l_s}\right)^3} \quad (5)$$

For the determination of $m_{OSM}$, the entire quantity of $m_{WSM}$ is used in the calculation. In the present study the water-soluble monomer is used at a 1:1 equivalent weight relative to the oil-soluble monomer for all of the capsule suspension preparations.

Conversely, the capsule wall thickness ls is calculated for each of the capsule suspension preparations using the VMD particle size for the value of $r_s$ and equation (6). These values are included in Table II.

$$l_s = \frac{r_s\left(\left(\frac{m_O + f_{WSM/OSM}m_{OSM}}{m_O - m_{OSM}}\right)^{\frac{1}{3}} - 1\right)}{\left(\frac{m_O + f_{WSM/OSM}m_{OSM}}{m_O - m_{OSM}}\right)^{\frac{1}{3}}} \quad (6)$$

Examples 1-5

A bulk sample of Drummer silty clay loam (sic) soil is collected, air-dried and crushed to pass a 2-mm screen. Following the soil preparation, approximately 25 grams of the processed soil is placed into beakers and treated with 7.5 ml water containing 10 mg N (as $(NH_4)_2SO_4$) and 0.0, 0.25 or 0.50 ppm nitrapyrin (based on the weight of soil sample) using each of the Example formulations 1-5. The treated soil is then evenly distributed over the soil surface and immediately covered with another 25 grams of soil. Three replications at each rate are provided as well as three 50 gram soil samples without fertilizer or inhibitor addition and three replications of N-Serve 24 (Dow AgroSciences) treated soil. Once liquid is absorbed into soil, the materials are mixed to attain even distribution of the fertilizer/Example formulation. After mixing, water is added to bring soil to field capacity. Beakers are unsealed, but covered to reduce evaporation and maintained at room temperature, approximately 25° C. The amount of water lost from each beaker is measured at 5-day intervals and replaced if the loss exceeds 2.5 ml.

On day 7, 14, 21, 28, 35, 42, 49, and 56 after initiation of the incubation, the soil contained in each individual beaker is dried, ground, and mixed. A subsample is analyzed for $NH_4$—N, as described by Mulvaney, R. L. 1996; "Nitrogen-Inorganic Forms", pg 1123-1184. In D. L. Sparks (ed.) *Methods of soil analysis: Part 3/SSSA Book Ser.5.SSSA*, Madison, Wis. If less than 30% of the N remains as ammonium in all replications of any treatment, analysis of that treatment is ceased. Averages of the replications are provided in Table III and Table IV.

TABLE III 0.5 ppm Nitrapyrin

| Example | PPM NH$_4$ | | | | |
|---|---|---|---|---|---|
| | Week 1 | Week 2 | Week 3 | Week 4 | Week 5 |
| No inhibitor Control | 82.7 | 74.3 | 54.8 | 38.5 | 24.3 |
| 1 | 82.3 | 84.2 | 67.7 | 59.6 | 48.9 |
| 2 | 82.5 | 79.5 | 71.3 | 63.1 | 49.8 |
| 3 | 81.8 | 78.8 | 67.6 | 64.3 | 46.7 |
| 4 | 88.5 | 81.8 | 77.5 | 55.6 | 46.1 |
| 5 | 82.9 | 78.0 | 70.8 | 57.0 | 51.7 |
| N-Serve 24 | 87.1 | 75.5 | 64.9 | 55.6 | 37.4 |

TABLE IV 0.25 ppm Nitrapyrin

| Example | PPM NH$_4$ | | | | |
|---|---|---|---|---|---|
| | Week 1 | Week 2 | Week 3 | Week 4 | Week 5 |
| No inhibitor Control | 82.7 | 74.3 | 54.8 | 38.5 | 24.3 |
| 1 | 83.2 | 79.6 | 68.0 | 57.3 | 43.9 |
| 2 | 82.6 | 78.4 | 64.7 | 53.6 | 42.4 |
| 3 | 81.4 | 73.8 | 61.1 | 50.7 | 37.9 |
| 4 | 78.5 | 72.6 | 60.3 | 48.5 | 37.3 |
| 5 | 83.5 | 78.1 | 61.0 | 48.0 | 35.1 |
| 0.5 N-Serve 24 | 87.1 | 75.5 | 64.9 | 55.6 | 37.4 |

The microencapsulated formulations are compared to the nitrapyrin N-Serve 24 (available from Dow AgroSciences) formulation at the same rate. At Week 5 all five encapsulated formulations are outperforming N-Serve 24, demonstrating that at the same rate they provide superior residual nitrogen-stabilizing performance.

Examples 6 and 7

All of the following examples further include an ionic stabilizer included in the aqueous phase. In the illustrative example, sodium dioctylsulphosuccinate (Geropon SDS, available from Rhodia) was used. Any other suitable ionic stabilizer may be used.

Four replications each of Example 6 and 7 formulations, and N-Serve 24 (0.5 lb a.i./acre; 0.58 kg/hectare) in combination with urea ammonium nitrate (160 lb/acre; 181.5 kg/hectare), as well as four replications of urea ammonium nitrate (160 lb N/acre; 181.5 kg/hectare) with 0 nitrification inhibitor treatment are applied to Drummer sicl samples clear of vegetation.

Following application of the example formulations, the formulations are incorporated immediately with moisture. Once incorporation occurs, treatments are open to native rainfall and environmental effects.

Soil samples are collected from each treatment and analyzed for NH$_4$—N as described by Mulvaney, as referenced previously, at 21, 28, 35, 42, 49 and 56 days after incorporation. Samples are collected from 0-3 inch (0-7.6 cm), depths for 8 weeks with additional samples collected from a 3-6 inch (7.6 cm-15.2 cm) depth in weeks 7 and 8 after the first treatment is incorporated. On the day of application, samples are collected from the 0-3 inch (0-7.6 cm) depth for NH$_4$—N analysis.

The effectiveness of a nitrification inhibitor to keep nitrogen in the ammonia form is measured by analyzing soil samples for the presence of the ammonium molecule (NH$_4$). Averages of the replications are reported in Table V.

TABLE V

Immediate incorporation of Controls and Examples 6 and 7

| Example | PPM NH$_4$ | | | | | | |
|---|---|---|---|---|---|---|---|
| | Week 3 | Week 4 | Week 5 | Week 6 | Week 7 | Week 8 | Week 9 |
| N-Serve-24 Comparison | 27.4 | 15.6 | 10.2 | 12.6 | 8.3 | 4.2 | 7.0 |
| UAN Control | 16.7 | 13.3 | 5.3 | 7.0 | 7.2 | 4.0 | 5.0 |
| Example 6 | 24.9 | 19.2 | 8.5 | 10.2 | 6.6 | 3.6 | 5.5 |
| Example 7 | 26.4 | 22.0 | 16.3 | 12.4 | 9.1 | 5.8 | 6.0 |

UAN—Urea ammonium nitrate

In a further analysis, the nitrification inhibition of Examples 6 and 7 are coupled with the surface stability of those formulations. The UAN alone and the UAN+N-Serve treatments are moisture incorporated on the day of application to the soil while the two example formulations lay on the soil surface for a week prior to incorporation. Plots awaiting moisture incorporation are protected from moisture when rain events are threatening. Results are listed in TABLE VI.

TABLE VI

Delayed incorporation for Examples 6 and 7

| Examples | PPM NH$_4$ | | | | | | | |
|---|---|---|---|---|---|---|---|---|
| | week 2 | week 3 | week 4 | week 5 | week 6 | week 7 | week 8 | week 9 |
| N-Serve-24 Comparison | 42.3 | 35.1 | 24.6 | 18.8 | 30.0 | 17.2 | 19.4 | 24.4 |
| UAN Control | 48.4 | 34.9 | 22.8 | 16.2 | 26.7 | 15.4 | 21.5 | 19.0 |
| Example 6 | 50.6 | 41.6 | 30.2 | 22.4 | 34.0 | 18.6 | 27.0 | 28.5 |
| Example 7 | 54.0 | 55.6 | 39.1 | 40.9 | 40.0 | 25.6 | 31.4 | 34.4 |

Both Examples 6 and 7 are more effective at nitrification inhibition than N-Serve 24.

Examples 8 and 9

The weight percentages of the components for capsule suspension preparation are listed in Table VII. Total batch size is 2.1 kg (Example 8) or 185 g (Example 9). Oil soluble monomer PAPI 27 (polymethylene polyphenylisocyanate, Dow Chemical), is added to a wide-mouthed jar. N-Serve TG (Dow AgroSciences; 90 wt % nitrapyrin) and Aromatic 200 (Exxon) are then added in the form of a nitrapyrin technical concentrated stock solution. The resulting homogeneous organic phase is combined with an aqueous solution composed of Kraftsperse 25M, Tergitol 15-S-7, Geropon SDS, and Proxcel GXL.

The resulting two-phase mixture is emulsified using a Silverson L4RT-A high-speed mixer fitted with the ¾ in. mixing tube and general purpose emulsification head. Emulsification is achieved by first mixing at relatively low speed (~1000 rpm) with the end of the mixing tube located in the aqueous phase to draw in the organic phase until well emulsified. The speed is then increased in discrete increments, measuring the particle size after each increase. This process is continued until the desired particle size (2.5 micron) is obtained.

The water-soluble amine ethylenediamine aqueous solution (20 wt % in example 8; wt % in example 9, example 10, and example 11) is then added dropwise while stirring at a reduced rate. Following the completion of the addition the resulting capsule suspension is stirred for an additional time to have the polyurea shell forming reaction to be fully completed. Following capsule formation, finishing phase including Avicel (as 5 wt % aqueous solution, Kelzan (as 1.5 wt % aqueous solution), Proxel GXL and the balance of the water were added as indicated in Table VII and a final homogenization was performed with the Silverson mixer. The dispersed phase, including nitrapyrin, aromatic 200, PAPI 27, and ethylene diamine, is 49.55 wt % (example 8) or 55.94 wt % (example 9).

Example 10

The weight percentages of the components for capsule suspension preparation are listed in Table VII. Total batch size is 100 kilograms. The processing is demonstrated in Scheme 1 (A). A homogenous solution of N-Serve TG (Dow AgroSciences, 90 wt % nitrapyrin) and Aromatic 200 (Exxon) is prepared by melting N-Serve TG and adding it to the solvent. To this, the oil soluble monomer PAPI 27 is added and mixed together to create the Oil Phase. The Aqueous Phase is prepared by mixing Kraftsperse 25M, Tergitol 15-S-7, Geropon SDS, Proxcel GXL, Antifoam 100 IND and water into a homogeneous solution.

The Oil Phase and Aqueous Phase are metered together in a 1.25:1.0 ratio through a rotor/stator homogenizer cell to create an emulsion of the desired particle size (2.5 micron). This process continues until the oil phase is depleted. The batch is cooled down to below 15° C. before the amine is added. The 30 weight % amine is added into the batch under agitation. The reaction vessel is stirred for a minimum of 2 hours before the viscosity components are added. The viscosity phase consists of 5 w/w % Avicel, 1.5 w/w % Kelzan S, 1% Proxel GXL and water. Additional water is added if necessary to achieve the target assay, then the batch is packaged for final use.

Example 11

The weight percentages of the components for capsule suspension preparation are listed in Table VII. Total batch size is 400 kilograms. The processing is demonstrated in Scheme 1 (B). A homogenous solution of N-Serve TG (Dow AgroSciences, 90 wt % nitrapyrin) and Aromatic 200 (Exxon) is prepared by melting N-Serve TG and adding it to the solvent. To this, the oil soluble monomer PAPI 27 is added and mixed together to create the Oil Phase. The Aqueous Phase is prepared by mixing Kraftsperse 25M, Tergitol 15-S-7, Geropon SDS, Proxcel GXL, Antifoam 100 IND and water into a homogeneous solution.

The Oil Phase and Aqueous Phase are metered together in a 1.25:1.0 ratio through a rotor/stator homogenizer cell to create an emulsion of the desired particle size (2.5 micron). This process continues until the oil phase is depleted. The batch is cooled down to below 15° C. before the amine is added. The 30 weight % amine is added into the batch by using a side stream circulation stream pumping the emulsion at a rate of 100 liters per minute. The amine is added in less than 10 minutes, preferably less than 5 minutes, to set the capsules walls. The reaction vessel is stirred for a minimum of 2 hours before the viscosity components are added. The viscosity phase consists of 5 w/w % Avicel, 1.5 w/w % Kelzan S, 1% Proxel GXL and water. Additional water is added if necessary to achieve the target assay, then the batch is packaged for final use.

TABLE VII

Example Compositions

| Material | Weight Percent (wt %) | | | |
|---|---|---|---|---|
| | Example 8 | Example 9 | Example 10 | Example 11 |
| N-Serve TG | 19.78 | 23.68 | 19.63 | 19.63 |
| Aromatic 200 | 18.91 | 22.65 | 18.78 | 18.78 |
| PAPI-27 | 8.87 | 7.72 | 8.80 | 8.80 |
| Dispersant[1] | 1.19 | 1.18 | 1.18 | 1.18 |
| Emulsifier[2] | 1.19 | 1.18 | 1.18 | 1.18 |
| Ionic Stabilizer[3] | 0.24 | 0.24 | 0.24 | 0.24 |
| Antiformer[4] | | 0.09 | 0.09 | 0.09 |
| Biocide[5] | 0.12 | 0.12 | 0.12 | 0.12 |
| Amine[6] | 1.99[a] | 1.90[b] | 1.97[c] | 2.17[c] |
| Suspending Aid[7] | 0.19 | 0.22 | 0.19 | 0.19 |
| Thickener[8] | | | 0.03 | 0.03 |
| Total Water | 47.52 | 41.02 | 47.79 | 47.59 |

[1] Kraftsperse 25M (available from MeadWestvaco)
[2] Tergitol 15-S-7 (available from The Dow Chemical Company)
[3] Geropon SDS (sodium dioctylsulphosuccinate available from Rhodia)
[4] Antiform 100 IND (available from Harcros Chemicals Inc.)
[5] Proxel GXL (1,2-Benzisothiazol-3(2H)-one available from Arch Chemicals, Inc.)
[6] EDA-ethylenediamine (available from Aldrich) in [a]20 wt %; [b]50 wt %; and [c]30 wt % aqueous solution
[7] Avecel (available from FMC Biopolymer)
[8] Kelzan S-Xanthan gum (available from CP Kelco)

What is claimed is:

1. A microcapsule suspension formulation comprising:
  (a) a suspended phase of a plurality of microcapsules having a volume median particle size of from about 1 to about 10 microns, wherein a microcapsule comprises:
    (1) a microcapsule wall produced by an interfacial polycondensation reaction between a polymeric isocyanate and a polyamine to form a polyurea shell having a weight percentage of about 0.2 to about 15 percent of a total weight of the microcapsule suspension formulation; and
    (2) a compound encapsulated within the polyurea shell wherein said compound is 2-chloro-6-(trichloromethyl)pyridine; and
  (b) an aqueous phase including an ionic stabilizer.

2. The microcapsule suspension formulation of claim 1 wherein the microcapsules have a volume median particle size of from about 1 to about 5 microns.

3. The microcapsule suspension formulation of claim 1 wherein the ratio of the suspended phase a) to the aqueous phase b) is from about 1:0.75 to about 1:20.

4. The microcapsule suspension formulation of claim 1 wherein the ratio of the suspended phase a) to the aqueous phase b) is from about 1:1 to about 1:7.

5. The microcapsule suspension formulation of claim 1 wherein the ratio of the suspended phase a) to the aqueous phase b) is from about 1:1 to about 1:4.

6. The microcapsule suspension formulation of claim 1 wherein the polymeric isocyanate is polymethylene polyphenylisocyanate.

7. The microcapsule suspension formulation of claim 1 wherein the polyamine is selected from ethylenediamine and diethylenetriamine.

8. A fertilizer composition comprising: a nitrogen fertilizer and the microcapsule suspension formulation of claim 1.

9. The fertilizer composition of claim 8 wherein the nitrogen fertilizer is urea ammonium nitrate.

10. A method of suppressing the nitrification of ammonium nitrogen in growth medium comprising applying the microcapsule suspension formulation of claim 1 to said growth medium.

11. The method of claim 10 wherein the formulation is incorporated into the growth medium.

12. The method of claim 10 wherein the formulation is applied to a growth medium surface.

13. The method of claim 10 wherein the formulation is applied in combination with a pesticide or sequentially with a pesticide.

14. The method of claim 10 wherein the formulation is applied with a nitrogen fertilizer.

15. The method of claim 14 wherein the nitrogen fertilizer is urea ammonium nitrate.

16. The method of claim 1, wherein the ionic stabilizer is sodium dioctylsulphosuccinate.

17. The method of claim 1, wherein the ionic stabilizer is from about 0.01 to about 0.5 weight of the microcapsule suspension formulation.

* * * * *